(12) United States Patent
Muroi et al.

(10) Patent No.: US 6,979,028 B2
(45) Date of Patent: Dec. 27, 2005

(54) PIPE JOINT

(75) Inventors: Akira Muroi, Saitama (JP); Tateyuki Kuwata, Saitama (JP); Mitsuhiro Oyama, Saitama (JP)

(73) Assignee: Tozen Corporation, Saitama (JP)

( * ) Notice: Subject to any disclaimer, the term of this patent is extended or adjusted under 35 U.S.C. 154(b) by 61 days.

(21) Appl. No.: 10/692,657

(22) Filed: Oct. 24, 2003

(65) Prior Publication Data
US 2004/0245775 A1 Dec. 9, 2004

(30) Foreign Application Priority Data
Jun. 6, 2003 (JP) .............................. 2003-161614

(51) Int. Cl.$^7$ .............................................. F16L 23/00
(52) U.S. Cl. ...................... 285/412; 285/368; 285/223
(58) Field of Search ................ 285/223, 368, 285/412

(56) References Cited

U.S. PATENT DOCUMENTS

| | | | |
|---|---|---|---|
| 787,791 A * | 4/1905 | Reynolds ..................... | 285/368 |
| 1,948,211 A * | 2/1934 | Fritz ............................. | 285/55 |
| 3,039,795 A * | 6/1962 | Reuter ......................... | 285/235 |
| 3,834,744 A * | 9/1974 | Masatchi ..................... | 277/607 |
| 4,003,210 A * | 1/1977 | Bostroem ................. | 405/184.5 |
| 4,616,860 A * | 10/1986 | Faria et al. .................. | 277/614 |
| 5,197,766 A * | 3/1993 | Glover et al. ................. | 285/14 |
| 5,316,320 A * | 5/1994 | Breaker ....................... | 277/611 |
| 5,558,344 A * | 9/1996 | Kestly et al. ................ | 277/608 |
| 5,884,946 A * | 3/1999 | Esser .......................... | 285/368 |
| 6,050,614 A * | 4/2000 | Kirkpatrick .................. | 285/368 |

FOREIGN PATENT DOCUMENTS

GB 2098295 A * 11/1982 ........... F16L 37/12

* cited by examiner

*Primary Examiner*—James M. Hewitt
(74) *Attorney, Agent, or Firm*—Flynn, Thiel, Boutell & Tanis, P.C.

(57) ABSTRACT

A pipe joint is made up of a hollow cylindrical joint body made of an elastic material with a prescribed length, a circular flange embedded into each of the ends of the joint body, through holes provided axially at prescribed intervals in the direction of the circumference of the flanges and the joint body, and both flanges connected to the joint body with a connecting appliance penetrating into these through holes.

5 Claims, 3 Drawing Sheets

PIPE JOINT

FIELD OF THE INVENTION

The present invention relates to a pipe joint for connecting piping used for fluid circulation.

BACKGROUND OF THE INVENTION

In a fluid circulation system as shown in FIG. 5, in order to minimize transmission of vibration generated in a power unit 50, such as a pump and a motor, to a piping system 51 as much as possible, the power unit 50 and the piping system 51 are connected via a pipe joint 52 having excellent vibration insulation properties. As the pipe joint 52, those such as the one shown in FIG. 6 are employed. This pipe joint 52 comprises a joint body 53 made of an elastic material, such as rubber, and a reinforcement member 54 made of a synthetic fiber or the like and embedded into the radial thickness of the joint body 53. Further, onto both openings 55, 55 of the joint body 53 are attached metallic flanges for connection 56, 56.

The pipe joint 52 as described above according to the conventional technology, however, inevitably needs to embed the reinforcement member 54 into the joint body 53 in order to keep the shape of the joint body 53, and moreover, as fluid pressure is exerted on the joint body 53, the joint body 53 expands and spreads axially, which stresses the piping system 51 by putting an unfavorable load thereon. In addition, when both flanges 56 are attached to the joint body 53, it is necessary to crush both ends of the joint body for fitting the flanges thereinto, which makes the work complicated.

SUMMARY OF THE INVENTION

The object of this present invention is, in view of the problems described above, to provide a pipe joint not requiring a reinforcement member, not bearing a load unfavorable to piping and the like, even when fluid pressure is exerted on the joint body, having a joint body with an increased safety and endurance, and capable of getting rid of complicatedness in attaching the flanges to the joint body.

In order to achieve the object described above, the pipe joint according to this invention is characterized in that the pipe joint comprises a hollow cylindrical joint body made of an elastic material with a prescribed length, and a circular flange embedded into both ends of the joint body. In the direction of the circumference of the flange and the joint body are provided a plurality of through holes communicating axially at prescribed intervals and both flanges are connected to the joint body with a connecting appliance inserted into these through holes.

The pipe joint according to this invention has the configuration as described above so that, even when fluid pressure is exerted on the joint body, connecting both flanges to the joint body with the connecting appliance makes it possible to prevent the joint body from spreading axially, not bearing a load unfavorable to piping and the like. Further, this can increase safety and endurance of the joint body. In addition to no need for embedding a reinforcement member into the joint body in order to keep the shape of the same, the work of attaching flanges is not necessary.

DETAILED DESCRIPTION OF THE PREFERRED EMBODIMENTS

One embodiment of the present invention is described with reference to the drawings.

Figure 1:
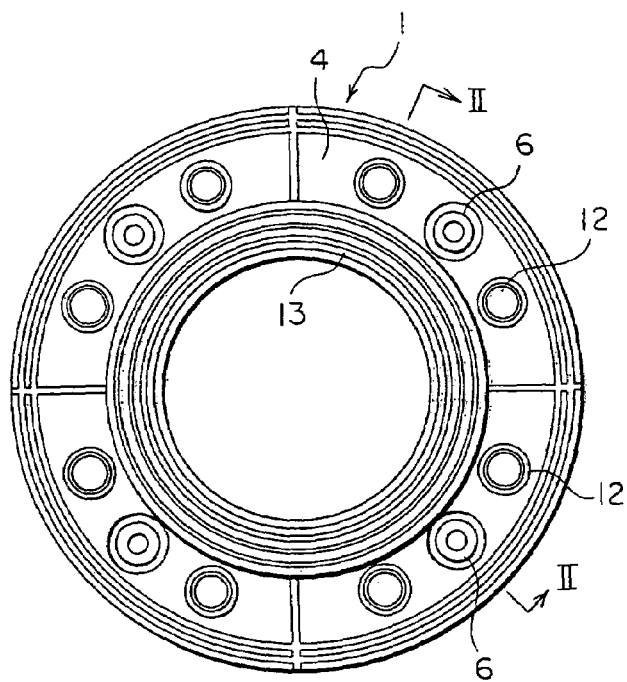
FIG. 1 is a side view showing a pipe joint according to one embodiment of the present invention.
Figure 2:
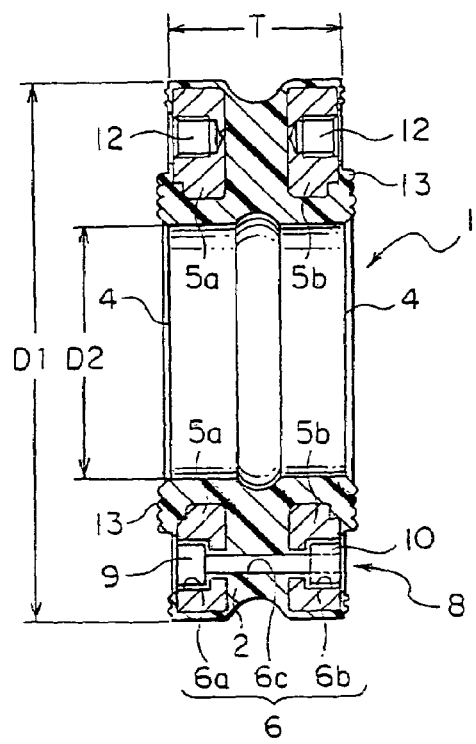
FIG. 2 is a vertical front view of FIG. 1 taken along the line II—II.

In FIGS. 1 and 2, the reference numeral 1 indicates a pipe joint comprising a hollow cylindrical joint body 2. The joint body 2 is made of thick elastic material having a capacity to resist pressure. At both ends inside the joint body 2 are embedded metallic circular flanges 5a, 5b each having the same shape. In the direction of the circumference of the flanges 5a, 5b and the joint body 2 are provided a plurality of through holes 6 communicating axially at prescribed intervals. In the flanges 5a, 5b, the through holes 6 are formed to be shoulder holes 6a, 6b, 6a being larger than 6b, while in the joint body 2, the through hole 6 is formed to be a shoulder hole 6c having the same diameter as that of the shoulder hole 6b. In the through hole 6 is inserted a bolt-nut 8 as a connecting appliance. Namely, the bolt-nut 8 specifically comprises a through bolt 9 and a nut 10, the head of the bolt 9 is held into the shoulder hole 6a on the side of one flange 5a, while the nut 10 is held into another shoulder hole 6a on the side of another flange 5b. In the direction of the circumference of the flanges 5a, 5b is provided a plurality of screw holes 12 for connecting piping on the same circumference on which the through holes 6 are provided. The screw hole 12 has the shape having a bottom and opens outwardly. The bolt-nut 8 described above connects the flanges 5a, 5b and the joint body 2, and fulfills a function to prevent the flanges 5a, 5b from spreading in the direction of the axis of the joint body 2. Further, on both surfaces of the outer side 4 of the joint body 2 on the side of the inner circumference is formed a convex seal packing 13 concentrically and multiplely into a unitary structure with the joint body 2.

To show one example of the specific size of the pipe joint 1, for example, the external diameter D1 of the joint body 2 is 220 mm, the internal diameter D2 is 105 mm, and the face-to-face distance (thickness) T is 75 mm. It is to be noted that this is only an example and is not intended to exclude other possible designs.

The joint body 2 is preferably made of a material having an elasticity which can absorb vibration from the piping and the like connected to the pipe joint 1, and a rigidity which can resist pressure from fluid circulating therein with several millimeters of displacement absorbency against eccentricity, expansion, contraction and the like, and, for example, chloroprene rubber or hard rubber with a hardness, such as EPDE, in the range of from about HS55 to about HS70 is preferable. Further, displacement absorbency against eccentricity, expansion, contraction and the like in the joint body 2 is preferably not more than 5 mm, and more preferably, not more than 3 mm.

The flanges 5a, 5b and the bolt-nut 8 are preferably made of a metal having a strength and rigidity capable of supporting the pipe joint 1 without deforming, even when a large fluid pressure is exerted on the pipe joint 1. It is to be noted that metal is not exclusively used for the case described above, and, needless to say, other materials can be used.

The seal packing 13 may have any other configuration and does not need to have the multiple configuration described above, as long as, when the pipe joint 1 is connected to some other pipe, the seal packing 13 can prevent the leakage of fluid through the connecting surface between the pipe joint 1 and some other pipe.

The liquid circulating in a pipe connected to the pipe joint 1 is not limited to a specific one as long as the liquid does not erode the elastic material forming the joint body 2, and water, seawater and gas or the like can be utilized advantageously. Further, the temperature of the fluid is preferably in the range from −20° C. to 90° C. When the temperature of the fluid is less than −20° C., there is a possibility that the joint body 2 disadvantageously loses elasticity, while, when the temperature of the fluid is more than 90° C., the joint body 2 may disadvantageously get soft or degraded, or lose endurance, thereby weakening its capacity to counter the liquid pressure. In addition, the pressure of the liquid is preferably less than 1.6 MPa. A liquid pressure of more than 1.6 MPa disadvantageously shortens the life of the joint body 2.

Figure 5:
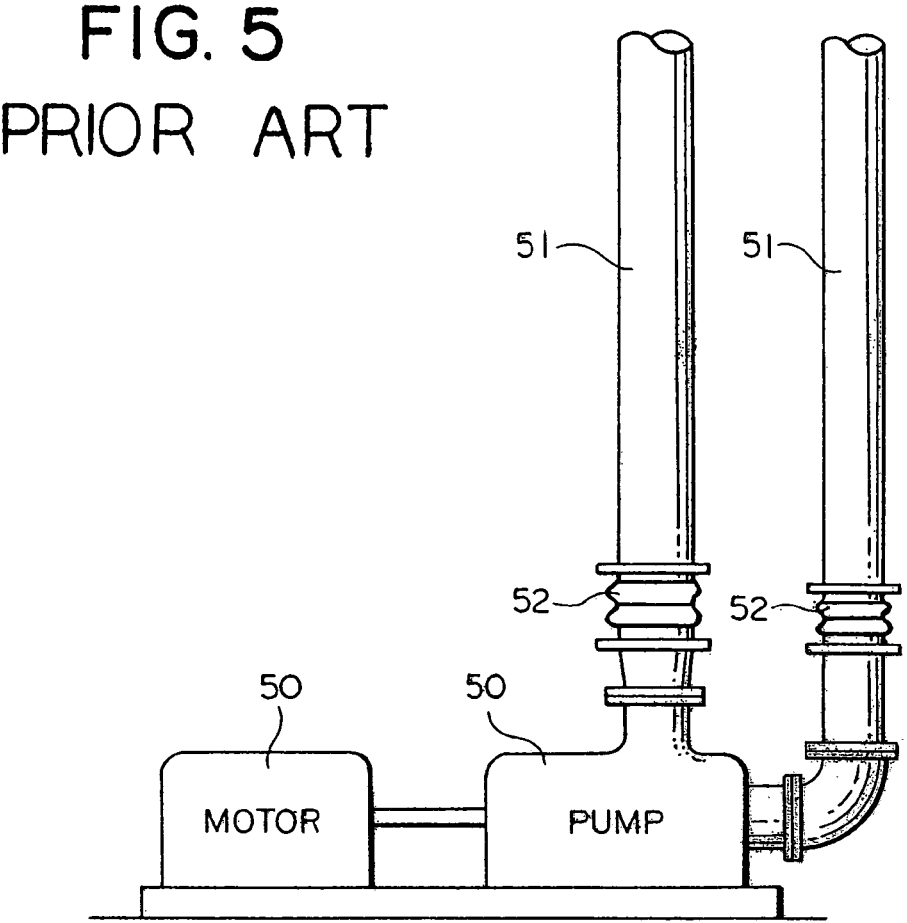
FIG. 5 is a schematic block diagram showing a prior art fluid circulation mechanism.
Figure 6:
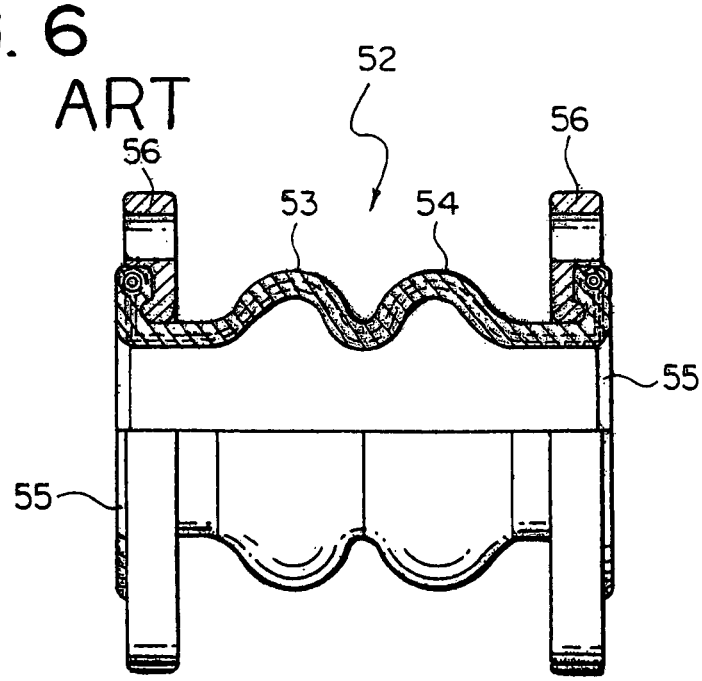
FIG. 6 is a front view with the upper half broken off showing a prior art pipe joint according to the conventional technology.

Next, the action of the pipe joint 1 is described below. When the pipe joint 1 is connected to a piping system 51 shown in FIG. 5, a connecting flange of the piping system 51 is applied to both surfaces of the outer side 4, a linking bolt not shown is then screwed into a screw hole for piping connection 12, and thus the pipe joint 1 is connected to the piping so that a piping is connected to another piping.

As described above, the pipe joint 1 comprises the joint body 2 made of elastic material so that, even when the internal pressure given by the fluid circulating in the joint body 2 tends toward spreading it axially, the bolt-nut 8 resists against the internal pressure and prevents the joint body 2 from spreading, which avoids a load on the piping and the like connected to the pipe joint 1. In a case where the bolt-nut 8 is degraded or the internal pressure is higher than expected, it is possible to prepare for the case by replacing the bolt-nut 8 with one having a greater endurance. On the other hand, the joint body 2 has a high rigidity, so that it is not necessary to embed a reinforcement member as in the conventional technology in order to keep the shape of the joint body 2. Further, as the flanges 5a, 5b are embedded into the joint body 2 beforehand, the work of attaching the flanges 5a, 5b is not required.

The joint body 2 between the flanges 5a, 5b is reinforced by the bolt-nut 8 positioned to penetrate the joint body 2 in the direction of the axis thereof so that expansion and contraction of the side wall of the joint body 2 vertical to the direction of the axis thereof can be suppressed. Further, on both surfaces of the outer side 4 of the pipe joint 1 is formed a convex seal packing 13 into a unitary structure with the joint body 2 so that, when the pipe joint 1 is connected to some other pipe, the seal packing 13 can prevent the leakage of fluid through the connecting surface between the pipe joint 1 and some other pipe, allowing an increased safety and endurance.

Figure 3:
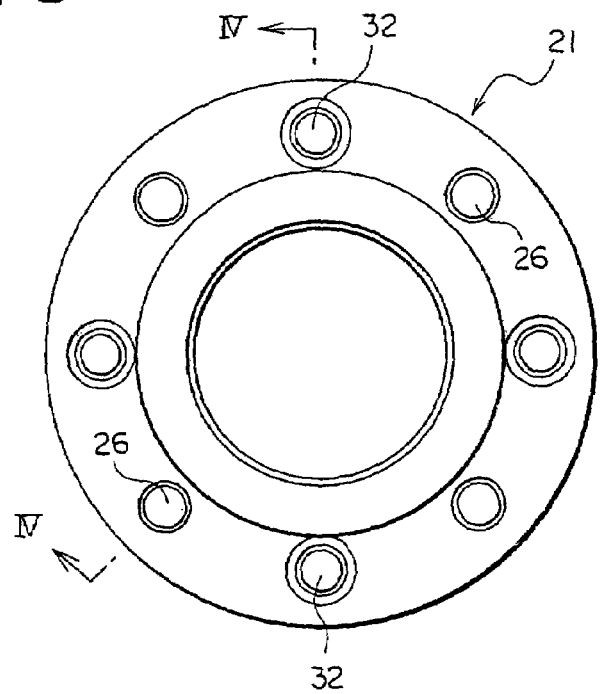
FIG. 3 is a side view according to another embodiment.
Figure 4:
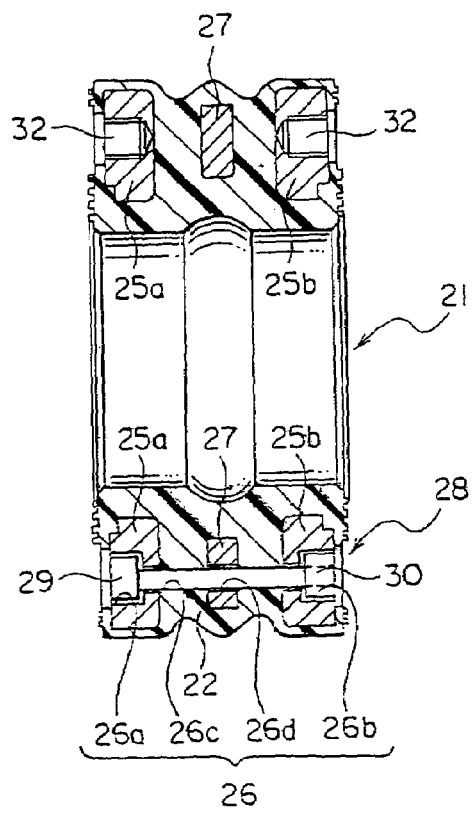
FIG. 4 is a vertical front view of FIG. 3 taken along the line IV—IV.

FIGS. 3 and 4 show a pipe joint according to another embodiment, and this pipe joint 21 is different from that of the embodiment described above in the point where basically the pipe joint 21 is embedded with a hard circular reinforcement member 27 made of a metal plate or the like positioned in the center between the flanges 25a, 25b embedded into both ends of the joint body 22, and the reinforcement member 27 is penetrated by a bolt-nut 28 as a connecting appliance. The reference numeral 26 indicates a through hole communicating axially and comprises shoulder holes 26a, 26b with larger and smaller diameters and formed on the flanges 25a, 25b, a shoulder hole 26c having the same diameter as that of 26b and formed on the joint body 2, and a shoulder hole 26d formed on the reinforcement member 27. The reference numeral 32 indicates a screw hole for connecting piping and a plurality of the same are provided in the direction of the circumference of the flanges 5a, 5b on the same circumference on which the through hole 26 is situated. The reference numeral 28 indicates a bolt-nut comprising a through bolt 29 and a nut 30.

The pipe joint 21 described above is also expected to have the same action as the pipe joint 1 according to the embodiments described above and, in addition to this, the pipe joint 21 according to this embodiment can ensure that the reinforcement member 27 further prevents the joint body 22 from spreading axially.

What is claimed is:

1. A pipe joint comprising a hollow cylindrical joint body made of an elastic material of a prescribed length and having two ends, a circular flange embedded into each of the ends of the joint body and a plurality of axially-extending through holes provided at prescribed intervals around the circumference of the flanges and the joint body, each of the through holes comprising a shoulder hole and having a through bolt provided therein, a head of the through bolt being held in a shoulder hole at one end of the joint body and a nut affixed to the through bolt being held in a shoulder hole at the other end of the joint body to connect both flanges to the joint body.

2. The pipe joint according to claim 1, wherein said joint body is made of a heat-resistant rubber and has a rigidity with several millimeters of displacement absorbency against eccentricity, expansion and contraction.

3. The pipe joint according to claim 1, wherein on the surface of the outer side of both flanges, a plurality of screw holes for connecting piping with an outward opening is provided in the direction of the circumference at prescribed intervals.

4. The pipe joint according to claim 1, wherein on the surface of the outer side of the joint body, a convex seal packing is formed into a unitary structure with the joint body.

5. A pipe joint comprising a hollow cylindrical joint body made of an elastic material of a prescribed length and having two ends, a circular flange embedded into each of the ends of the joint body, a circular reinforcement member embedded in the joint body between the two circular flanges and a plurality of axially-extending through holes provided at prescribed intervals around the circumference of the flanges and the joint body, each of the through holes comprising a shoulder hole and having a through bolt provided therein, a head of the through bolt being held in a shoulder hole at one end of the joint body and a nut affixed to the through bolt being held in a shoulder hole at the other end of the joint body to connect both flanges to the joint body.

* * * * *